(12) United States Patent
Alves et al.

(10) Patent No.: US 11,036,639 B2
(45) Date of Patent: Jun. 15, 2021

(54) CACHE APPARATUS AND METHOD THAT FACILITATES A REDUCTION IN ENERGY CONSUMPTION THROUGH USE OF FIRST AND SECOND DATA ARRAYS

(71) Applicant: ARM Limited, Cambridge (GB)

(72) Inventors: Ricardo Daniel Queiros Alves, Uppsala (SE); Nikos Nikoleris, London (GB); Shidhartha Das, Upper Cambourne (GB); Andreas Lars Sandberg, Cambridge (GB)

(73) Assignee: ARM Limited, Cambridge (GB)

( * ) Notice: Subject to any disclaimer, the term of this patent is extended or adjusted under 35 U.S.C. 154(b) by 618 days.

(21) Appl. No.: 15/864,062

(22) Filed: Jan. 8, 2018

(65) Prior Publication Data

US 2018/0203802 A1     Jul. 19, 2018

(30) Foreign Application Priority Data

Jan. 18, 2017   (GR) .............................. 20170100015

(51) Int. Cl.
*G06F 12/00*         (2006.01)
*G06F 12/0864*       (2016.01)
(Continued)

(52) U.S. Cl.
CPC ...... *G06F 12/0864* (2013.01); *G06F 12/0862* (2013.01); *G06F 12/0895* (2013.01);
(Continued)

(58) Field of Classification Search
CPC ............. G06F 12/0864; G06F 12/0862; G06F 12/0895; G06F 12/0897
See application file for complete search history.

(56) References Cited

U.S. PATENT DOCUMENTS 5,542,062 A * 7/1996 Taylor ................. G06F 12/0888
                                                  711/118
6,122,709 A * 9/2000 Wicki ................. G06F 12/1054
                                                  711/118
(Continued)

OTHER PUBLICATIONS

Batson et al., "Reactive-Associative Caches", Appears in the Conference on Parallel Architectures and Compilation, Sep. 2001, 12 pages.
(Continued)

*Primary Examiner* — Reginald G Bragdon
*Assistant Examiner* — Michael L Westbrook
(74) *Attorney, Agent, or Firm* — Nixon & Vanderhye P.C.

(57) ABSTRACT

A cache apparatus is provided comprising a data storage structure providing N cache ways that each store data as a plurality of cache blocks. The data storage structure is organised as a plurality of sets, where each set comprises a cache block from each way, and further the data storage structure comprises a first data array and a second data array, where at least the second data array is set associative. A set associative tag storage structure stores a tag value for each cache block, with that set associative tag storage structure being shared by the first and second data arrays. Control circuitry applies an access likelihood policy to determine, for each set, a subset of the cache blocks of that set to be stored within the first data array. Access circuitry is then responsive to an access request to perform a lookup operation within an identified set of the set associative tag storage structure overlapped with an access operation to access within the first data array the subset of the cache blocks for the identified set. In the event of a hit condition being detected that identifies a cache block present in the first data array, that access request is then processed using the cache block accessed within the first data array. If instead a hit condition is detected that identifies a cache block absent in (Continued)

the first data array, then a further access operation is performed to access the identified cache block within a selected way of the second data array. Such a cache structure provides a high performance and energy efficient mechanism for storing cached data.

20 Claims, 5 Drawing Sheets

(51) Int. Cl.
  *G06F 12/0862* (2016.01)
  *G06F 12/0895* (2016.01)
  *G06F 12/0897* (2016.01)
  *G06F 12/0888* (2016.01)

(52) U.S. Cl.
  CPC ...... *G06F 12/0897* (2013.01); *G06F 12/0888* (2013.01); *G06F 2212/1024* (2013.01); *G06F 2212/1028* (2013.01); *G06F 2212/507* (2013.01); *G06F 2212/602* (2013.01); *Y02D 10/00* (2018.01)

(56) References Cited

U.S. PATENT DOCUMENTS

| | | | | |
|---|---|---|---|---|
| 2003/0154345 | A1* | 8/2003 | Lyon | G06F 12/0864 711/122 |
| 2013/0097386 | A1* | 4/2013 | Lee | G06F 12/0864 711/128 |
| 2014/0089558 | A1* | 3/2014 | Baderdinni | G06F 12/0871 711/102 |

OTHER PUBLICATIONS

Dropsho et al., "Integrating Adaptive On-Chip Storage Structures for Reduced Dynamic Power", Parallel Architectures and Compilation Techniques—Conference Proceedings, ACT, Jan. 2002, pp. 141-152.

Ghosh et al., "Way Guard: A Segmented Counting Bloom Filter Approach to Reducing Energy for Set-Associative Caches", ISLPED '09, Aug. 19-21, 2009, pp. 165-170.

Giorgi et al., "Reducing leakage in power-saving capable caches for embedded systems by using a filter cache", MEDEA '07, Sep. 16, 2007, pp. 97-104.

Calder et al., "Predictive Sequential Associative Cache", High-performance Computer Architecture, Feb. 1996, 10 pages.

Inoue et al., Way-Predicting Set-Associative Cache for High Performance and Low Energy Consumption, ISLPED99, Aug. 1999, pp. 273-275.

Kaylan et al., "Word-Interleaved Cache: An Energy Efficient Data Cache Architecture", ISLPED'08, Aug. 11-13, 2008, pp. 265-270.

Keramidas et al., "Applying Decay to Reduce Dynamic Power in Set-Associative Caches", HiPEAC 2007, Jan. 2007, pp. 38-53.

Kin et al., "The Filter Cache: An Energy Efficient Memory Structure", IEEE, Dec. 1997, pp. 184-193.

Memik et al., "Just Say No: Benefits of Early Cache Miss Determination", IEEE Computer Society, Feb. 2003, 10 pages.

Mingming et al., "Reducing Cache Energy Consumption by Tag Encoding in Embedded Processors", ISLPED '07, Aug. 27-29, 2007, pp. 367-370.

Nicolaescu et al., "Fast Speculative Address Generation and Way Caching for Reducing LI Data Cache Energy", International Conference on Computer Design, Oct. 2006, 7 pages.

Powell et al., "Reducing Set-Associative Cache Energy via Way-Prediction and Selective Direct-Mapping", Proceedings of the $34^{th}$ International Symposium on Microarchitecture (MICRO), Dec. 2001, 12 pages.

So et al., "Cache Operations by MRU Change", IEEE Transactions on Computers, vol. 37, No. 6, Jun. 1988, pp. 700-709.

Su et al., "Cache Designs for Energy Efficiency", Proceedings of the $28^{th}$ Annual Hawaii International Conference on System Sciences, Feb. 1995, 10 pages.

Yang et al., "Energy Efficient Frequent Value Data Cache Design", IEEE, Nov. 2002, pp. 197-207.

Zhang et al., "A Way-Halting Cache for Low-Energy High-Performance Systems", ISLPED '04, Aug. 9-11, 2004, pp. 126-131.

\* cited by examiner

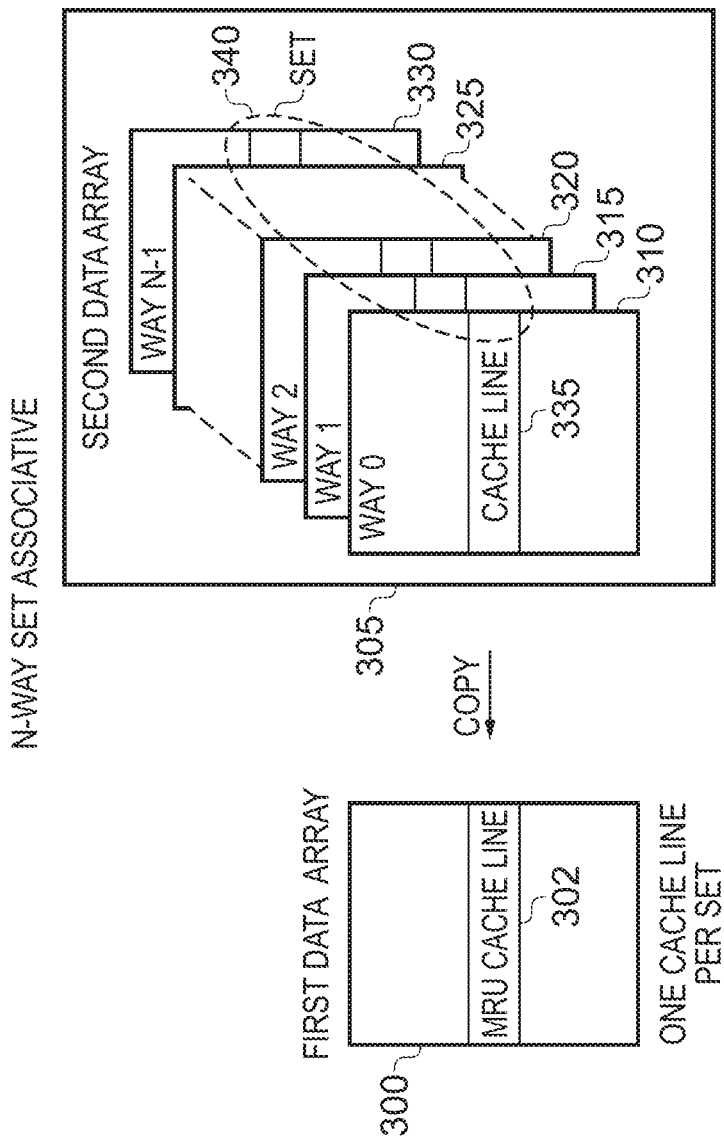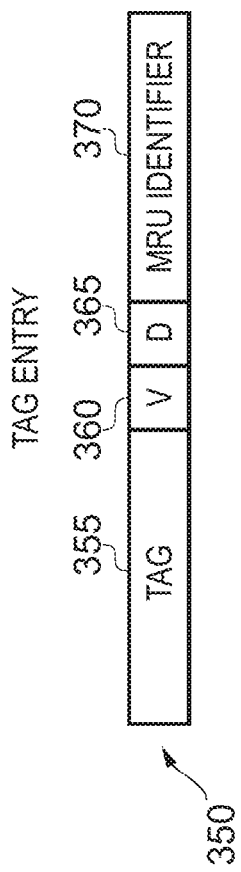
FIG. 4A
FIG. 4B

CACHE APPARATUS AND METHOD THAT FACILITATES A REDUCTION IN ENERGY CONSUMPTION THROUGH USE OF FIRST AND SECOND DATA ARRAYS

This application claims priority to GR Patent Application No. 20170100015 filed Jan. 18, 2017, the entire contents of which are hereby incorporated by reference.

BACKGROUND

The present technique relates to a cache apparatus and to a method of caching data within such a cache apparatus.

Most modern data processing systems employ caches to seek to reduce latency when accessing data values in memory. Set associative caches are typically used due to their lower miss ratio than directly mapped caches. Often, in order to mitigate latency when accessing caches, the tag array and the data array are accessed in parallel. However, within set associative caches such an approach requires accessing all ways of the data array in parallel, which is wasteful in terms of energy consumption, the energy/power cost increasing with the associativity of the cache.

Various way prediction techniques have been developed to try to reduce energy consumption by seeking to reduce the number of ways that are accessed within the cache in order to service an access request. However, way prediction techniques trade accuracy for latency. The more accurate way predictors typically have an adverse impact on latency due to being within the critical path, whilst way prediction schemes that use information that enables the prediction to be performed off of the critical path are typically significantly less accurate.

Another proposed technique is to provide a filter cache between the CPU and a first level cache, with the aim of seeking to reduce the number of lookups required in the level one cache. However, if there are a significant number of misses in the filter cache, then this technique can significantly reduce the potential energy efficiency gains, and can decrease performance for level one cache misses.

It would accordingly be desirable to provide an improved technique for implementing a set associative cache.

SUMMARY

In one example configuration, there is provided a cache apparatus comprising: a data storage structure providing N cache ways that each store data as a plurality of cache blocks, the data storage structure being organised as a plurality of sets, where each set comprises a cache block from each way, the data storage structure comprising a first data array and a second data array, at least the second data array being set associative; a set associative tag storage structure to store a tag value for each cache block, the set associative tag storage structure being shared by the first data array and the second data array; control circuitry to apply an access likelihood policy to determine, for each set, a subset of the cache blocks of that set to be stored within the first data array; access circuitry, responsive to an access request, to perform a lookup operation within an identified set of the set associative tag storage structure overlapped with an access operation to access within the first data array the subset of the cache blocks for the identified set; the access circuitry being responsive to a hit condition being detected by the lookup operation that identifies a cache block present in the first data array, to process the access request using the identified cache block as accessed within the first data array, and being responsive to a hit condition being detected by the lookup operation that identifies a cache block absent in the first data array, to perform a further access operation to access the identified cache block within a selected way of the second data array.

In another example configuration, there is provided a method of caching data, comprising: providing a data storage structure having N cache ways that each store data as a plurality of cache blocks, and organising the data storage structure as a plurality of sets, where each set comprises a cache block from each way, the data storage structure comprising a first data array and a second data array, and at least the second data array being set associative; providing a set associative tag storage structure to store a tag value for each cache block, the set associative tag storage structure being shared by the first data array and the second data array; applying an access likelihood policy to determine, for each set, a subset of the cache blocks of that set to be stored within the first data array; responsive to an access request, performing a lookup operation within an identified set of the set associative tag storage structure overlapped with an access operation to access within the first data array the subset of the cache blocks for the identified set; responsive to a hit condition being detected by the lookup operation that identifies a cache block present in the first data array, processing the access request using the identified cache block as accessed within the first data array; and responsive to a hit condition being detected by the lookup operation that identifies a cache block absent in the first data array, performing a further access operation to access the identified cache block within a selected way of the second data array.

In a yet further example configuration, there is provided a cache apparatus comprising: a data storage means for providing N cache ways that each store data as a plurality of cache blocks, the data storage means organised as a plurality of sets, where each set comprises a cache block from each way, the data storage means comprising a first data array means and a second data array means, at least the second data array means being set associative; a set associative tag storage means for storing a tag value for each cache block, the set associative tag storage means being shared by the first data array means and the second data array means; control means for applying an access likelihood policy to determine, for each set, a subset of the cache blocks of that set to be stored within the first data array means; access means for performing, in response to an access request, a lookup operation within an identified set of the set associative tag storage means overlapped with an access operation to access within the first data array means the subset of the cache blocks for the identified set; the access means, responsive to a hit condition being detected by the lookup operation that identifies a cache block present in the first data array means, for processing the access request using the identified cache block as accessed within the first data array means, and being responsive to a hit condition being detected by the lookup operation that identifies a cache block absent in the first data array means, for performing a further access operation to access the identified cache block within a selected way of the second data array means.

BRIEF DESCRIPTION OF THE DRAWINGS

The present technique will be described further, by way of example only, with reference to embodiments thereof as illustrated in the accompanying drawings, in which:

FIGS. 4A and 4B illustrate one arrangement of the first data array and the second data array that may be used in some embodiments, along with the format of associated tag entries within the tag array.

DESCRIPTION OF EMBODIMENTS

Figure 1:
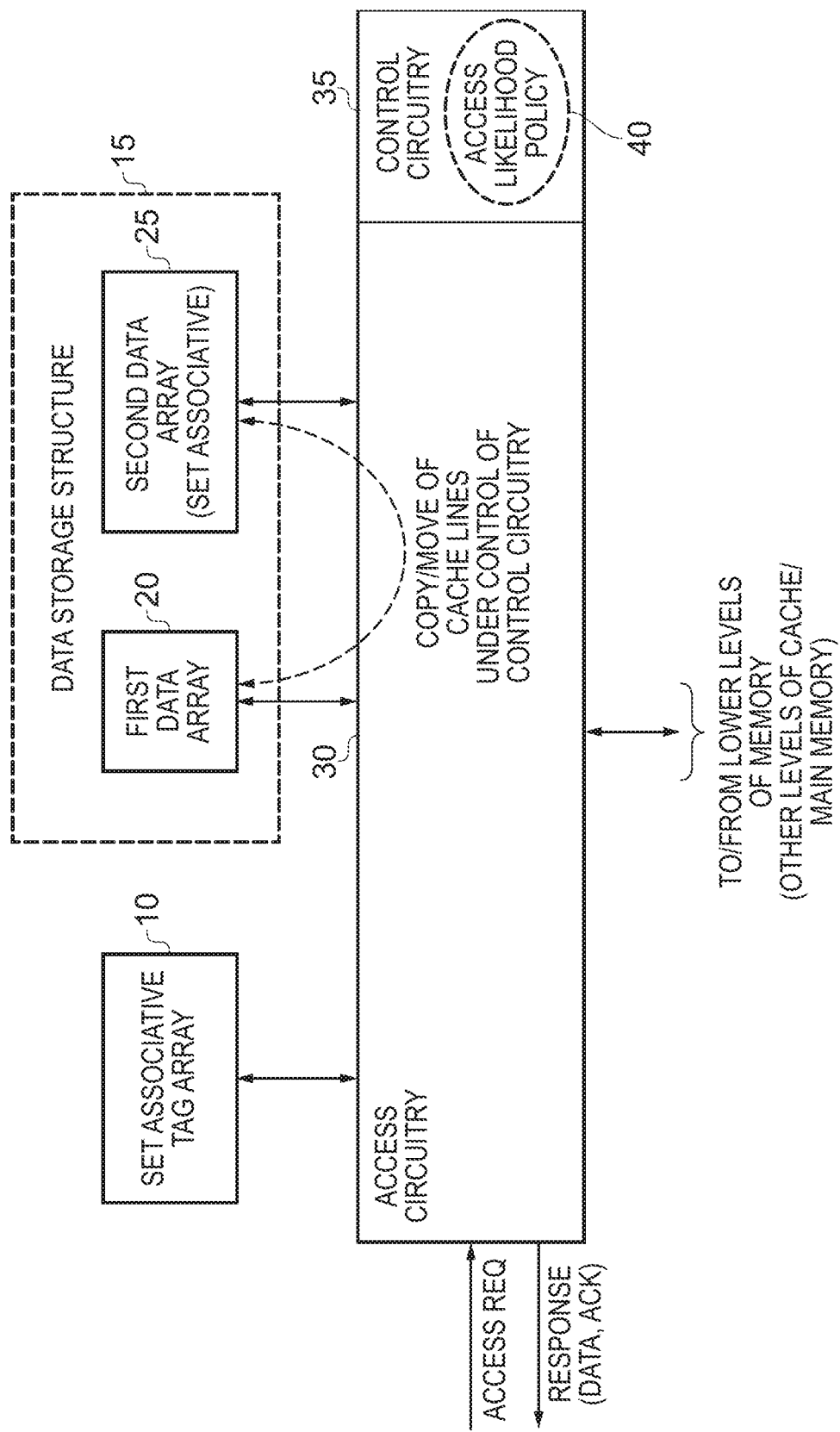
FIG. 1 is a block diagram of a cache apparatus in accordance with one embodiment.

Before discussing the embodiments with reference to the accompanying figures, the following description of embodiments is provided.

As mentioned earlier, with the aim of reducing the energy consumption of set associative caches, it is known to seek to provide way predictors in association with such caches. Way predictors store information that seeks to predict in which way of the data array a hit will be found, with that information being referred to on receipt of an access request for initiating an access within the cache. By such an approach, only the predicted way within the data array is accessed initially, but in case of a misprediction a second probe is made to the data array in order to access the correct way. The information in the prediction table is typically then updated. Known way prediction schemes typically trade accuracy for latency. In particular, to improve accuracy they often require access to the physical address (which is often impractical), or the virtual address (which adds latency due to the prediction mechanism being in the critical path). If instead they use other information such as the program counter value and the register that is used during the address calculation, this can allow the prediction to be performed in parallel with the address calculation, hence reducing latency, but typically results in significantly reduced accuracy in the prediction. In the event of mispredictions, this can cause significant delays. Even if a perfect way prediction were developed (with no misprediction), such a solution cannot be faster than caches which adopt a parallel access to all ways of the data array whilst also accessing the tag array, due to the latency added by such a way prediction mechanism.

Another known technique adopted in association with a level one cache is to provide a small filter cache between the CPU and the level one cache. Filter caches can provide some energy savings. In addition, they can provide a significant performance boost if the required data is found within the filter cache. However, if it is not found within the filter cache, then the data still needs to be fetched from the level one cache, and often the level one cache access is performed in parallel within all ways of the data array to reduce the miss penalty, resulting in significant energy inefficiency, particularly for highly associative caches.

The technique of the described embodiments aims to provide an improved set associative cache structure that can reduce dynamic energy usage and speed up cache accesses. In accordance with the described embodiments, a cache apparatus has a data storage structure providing N cache ways that each store data as a plurality of cache blocks (the cache blocks also typically being referred to as cache lines). The data storage structure is organised as a plurality of sets, where each set comprises a cache block from each way. In accordance with the described embodiments, the data storage structure comprises a first data array and a second data array, at least the second data array being set associative.

In addition, a set associative tag storage structure is provided to store a tag value for each cache block. The set associative tag storage structure is shared by the first data array and the second data array. Further, control circuitry is provided to apply an access likelihood policy to determine, for each set, a subset of the cache blocks of that set to be stored within the first data array. Hence, the control circuitry may move or copy data from the second data array into the first data array, with the aim of ensuring that, for each set, the data that is considered most likely to be used resides within the first data array. The first data array and the second data array may be physically separate arrays, or may be logically separate arrays provided within the same physical storage structure. Irrespective of whether the first and second data arrays are physically or logically separate, the control circuitry is able, on a set by set basis, to control which data is stored within the first data array, through application of the access likelihood policy.

Access circuitry is then responsive to an access request to perform a lookup operation within an identified set of the set associative tag storage structure. Overlapped with that lookup operation, the access circuitry also performs an access operation to access within the first data array the subset of the cache blocks for the identified set. At this point, the second data array is not accessed. The degree to which the lookup operation and the above access operation are overlapped can vary dependent on embodiment, but in one embodiment the lookup operation and the access operation are performed in parallel. The aim is that by the time the outcome of the lookup operation is available, then the subset of the cache blocks within the relevant set of the first data array have been accessed so that that data is available.

In response to a hit condition being detected by the lookup operation that identifies a cache block present in the first data array, the access circuitry can then directly proceed to process the access request using the identified cache block as accessed within the first data array. For a read operation, this may involve the required data being returned to the source of the access request, for example a processor core, whereas in the example of a write access request, the access circuitry may then use the write data to update the cache block in the first data array. This provides a high performance and low energy consumption mechanism, since no separate way prediction circuitry needs to be provided and invoked before the access can begin, and only the first data array is accessed at the same time as the lookup operation is performed.

In response to a hit condition being detected by the lookup operation that identifies a cache block absent in the first data array, then a further access operation can be performed to access the identified cache block within a selected way of the second data array. At this point, only an individual way within the second data array needs to be accessed, since the information associated with the hit condition will identify the way in which the data resides. Hence, whilst the need to perform this further access has some impact on performance, it is performed in an energy efficient manner.

Further, overall, a cache apparatus structure as set out above provides good performance with a reduced dynamic energy usage, due to a high hit ratio that can be achieved within the first data array (due to the control circuitry applying the access likelihood policy to seek to maintain within the first data array, for each set, cache blocks that are considered most likely to be accessed by subsequent access requests).

In one embodiment, in the event of a miss condition being detected by the lookup operation, the access circuitry is arranged to issue a cache miss signal whilst bypassing performance of an access to the second data array. Hence, misses can be handled in an energy efficient manner, since there is no need for the second data array to be accessed. Further, the detection of the miss condition occurs quickly, since the lookup operation can proceed without needing to first perform any way prediction, and the miss signal can be output as soon as the tag lookup operation has been completed.

The access likelihood policy can take a variety of forms. In one embodiment, the control circuitry is arranged, when applying the access likelihood policy for each set, to select for storage in the first data array the cache block from one or more most recently used ways of that set. There are a number of techniques that can be used for determining the most recently used ways. However, in one embodiment that information can be derived from metadata maintained in association with the various tag values in the set associative tag storage structure.

In one particular embodiment, the control circuitry may be arranged, for each set, to select for storage in the first data array the cache block from a most recently used way of that set. Hence, in such embodiments, for each set, the cache block for only one way will be stored within the first data array.

In one such embodiment, the first data array is hence organised as a direct mapped array, and stores, for each set, the cache block for one way of that set as determined by the control circuitry. The access to the first data array can hence be performed with high performance, and low energy consumption.

The set associative tag storage structure can be organised in a variety of ways, but in one embodiment has a plurality of entries, each entry arranged to store a tag value and associated attributes. The associated attributes are sufficient to enable the access circuitry, when the hit condition is detected during the lookup operation, to determine whether the cache block identified by the hit condition is present in the first data array. The associated attributes may already be provided within the entries for other purposes. For example, they may be referred to when applying a replacement policy to determine which cache block to evict from the cache during a linefill operation. However, such associated attributes can also be used not only to identify information appropriate to a replacement policy (for example a least recently used cache block within a particular set), but also information useful when applying the access likelihood policy in order to determine which cache block, or cache blocks, to store within the first data array, for example identifying which cache block is the most recently used cache block. It is often found that accesses to data in the cache follow a pattern that means that, for any particular set, the way that is most likely to be accessed next is the way that was accessed most recently.

However, the technique is not limited to situations where the cache blocks stored within the first data array are the cache blocks for the most recently accessed ways, and any other suitable mechanism may be identified within the access likelihood policy to determine which cache blocks are most likely to be the subject of the next access request, on a set by set basis, and then for the control circuitry to move data between the first and second data arrays as required in order to ensure that such data resides within the first data array.

The first and second data arrays can be arranged in a variety of ways. In one embodiment, the second data array is arranged to store all of the cache blocks for each of the N cache ways, and the control circuitry is arranged, for each set, to cause the determined subset of the cache blocks of that set to be copied into the first data array. Hence, in this embodiment, the second data array stores all of the data cached within the cache apparatus, and the first data array maintains a copy of a subset of that data.

In one such embodiment, when application of the access likelihood policy causes the determined subset of the cache blocks to change, the control circuitry causes any cache block removed from (and hence no longer in) the determined subset to be overwritten in the first data array by a new cache block of the determined subset as copied from the second data array. Since the second data array maintains a full copy of all of the data, any cache block in the first data array can merely be overwritten with the new cache block. In particular, in one embodiment, if any data within a cache block held in the first data array is updated whilst it resides within the first data array, due for example to a write operation being performed, the control circuitry will also cause the update to be replicated within the second data array, and accordingly the content of the first data array is always merely a copy of what is present in the second data array.

This hence provides an efficient mechanism for managing the content of the first data array.

In an alternative embodiment, the second data array may be arranged to store those cache blocks of the N cache ways that are not stored in (and hence absent from) the first data array, and the control circuitry is arranged to move cache blocks between the first and second data arrays so as to ensure that, for each set, the determined subset of the cache blocks of that set are stored in the first data array. Hence, in this embodiment, the first and second data arrays collectively store all of the data maintained by the cache apparatus, but the second data array does not maintain a complete copy of all of the data. Instead, the control circuitry moves cache blocks between the first and second data arrays as required, in accordance with the access likelihood policy, to seek to ensure that, for each set, the data most likely to be accessed next resides within the first data array. There are a number of ways in which the cache blocks can be moved, but in one embodiment a swap operation may be used to move one cache block from the second data array to the first data array, whilst at the same time moving the cache block in the first data array that is going to be overwritten by the received content from the second data array, so that that cache block is passed back to the second data array for storage therein.

In such embodiments, it is important for the set associative tag storage structure to be able to keep track of where any particular cache block resides. In one embodiment, this is achieved by the set associative tag storage structure having a plurality of entries, each entry arranged to store a tag value and a way pointer to identify which way contains the cache block associated with that tag value. The control circuitry is arranged to cause the way pointer for a tag value associated with a cache block moved between the first and second data arrays to be updated to take account of the movement of the cache block. Through the use of such way pointers, there is no need for tag values to be moved between entries of the tag storage structure as the corresponding cache blocks are moved between the first and second data arrays, and instead it is merely necessary to update the way pointer to ensure that, for each tag value stored in the tag storage structure, the way in which the associated cache block is stored is correctly identified.

In an alternative embodiment, there may be no need to provide such a way pointer, and instead the control circuitry may be arranged to cause the tag value associated with the cache block moved between the first and second data arrays to be moved between entries of the tag storage structure to take account of the movement of the cache block. In such an embodiment, the entries within the tag storage structure can be considered to be organised into N cache ways, and when a cache block for set A is moved between way X and way Y, the corresponding tag value is also moved between a tag entry for way X and a tag entry for way Y within the set A.

The control circuitry may in one embodiment be arranged to continually apply the access likelihood policy, whilst in alternative embodiments it may be responsive to one or more events to apply the access likelihood policy in order to alter the subset of the cache blocks to be stored within the first data array for at least one set.

Such events can take a variety of forms. For example, in one embodiment, the one or more events may comprise detection of the hit condition by the lookup operation when that hit condition identifies a cache block absent in the first data array, the control circuitry being arranged to cause the identified cache block accessed within the selected way of the second data array in response to that hit condition to be stored within the first data array. In particular, in embodiments where it is determined that the most recently accessed cache block is likely to be the cache block accessed next, then upon occurrence of such an event, this indicates a situation where it would be appropriate to ensure that that the accessed cache block is now stored within the first data array. This may merely involve making a copy of that cache block within the first data array, in embodiments where the second data array maintains a complete copy of all of the data stored by the cache, or may involve migrating that cache block from the second data array to the first data array, typically with a corresponding migration of a cache block from the first data array back to the second data array, in embodiments where the first and second data arrays collectively maintain all of the data stored within the cache.

As another example, said one or more events may comprise a miss condition being detected by the lookup circuitry, causing a cache block to be retrieved from memory for storage in the data storage structure, the control circuitry causing the retrieved cache block to be stored within the first data array. In such an embodiment, it is assumed that a cache block retrieved into the cache is highly likely to be the subject of a subsequent access request, and accordingly it is determined appropriate to store that cache block within the first data array. Depending on how the first and second data arrays are organised, in one embodiment the control circuitry may also cause the retrieved cache block to be stored within the second data array in addition to being stored within the first data array.

As an alternative, it may be considered that a cache block retrieved following a miss condition (or a cache block retrieved as a result of issuing a prefetch request) should not initially be stored within the first data array, but instead that retrieved cache block should initially be stored within the second data array, but then subsequently moved to the first data array if a subsequent access request targets that cache block. In particular, in some implementations, it may not be appropriate to assume that a retrieved cache block will automatically be the most likely cache block to be accessed next for the particular set. Instead, that retrieved cache block will initially be stored within the second data array, and only be promoted to the first data array if a subsequent access does indeed access a data value within that cache block.

There are a number of ways in which the identified set for a lookup operation can be determined, and the presence of a hit condition detected. In one embodiment, the access circuitry is responsive to an address specified by the access request to use an index portion of the address to determine the identified set of the set associative tag storage structure within which the lookup operation is performed, and the hit condition indicates that a tag portion of the address matches a tag value for one of the cache blocks in that identified set.

Particular embodiments will now be described with reference to the Figures.

FIG. 1 is a block diagram of a cache apparatus in accordance with one embodiment. The apparatus has a set associative tag array 10 having a plurality of entries for storing tag values associated with cache blocks stored within the data storage structure 15. The data storage structure 15 essentially provides a set associative data structure for storing cache blocks, in one embodiment each cache block being a cache line containing a number of data values. However, as shown in FIG. 1, the data storage structure 15 comprises two separate data arrays, a first data array 20 and a second data array 25. Whilst the second data array 25 is set associative, the first data array 20 need not be, and in one embodiment is a direct mapped structure storing one cache block for each set of the cache. In an alternative arrangement, the first data array may be set associative, for example enabling it to store two cache lines per set. Whilst in one embodiment the first and second data arrays 20, 25 may be physically separate storage structures, in an alternative embodiment they may be logically separate arrays provided within the same physical data storage structure.

Access circuitry 30 is provided for accessing the tag array 10 and the data storage structure 15, the access circuitry being able to individually access the first data array 20 or the second data array 25.

Control circuitry 35 is also provided for controlling which cache lines are stored within the first data array and which cache lines are stored within the second data array, the control circuitry being able to make this decision on a set-by-set basis. In particular, the control circuitry 35 applies an access likelihood policy 40 to seek to determine, for each set, a subset of the cache blocks of that set to be stored within the first data array, with the aim of ensuring that at any point in time the first data array contains the data that is most likely to be accessed by the next access requests. In particular, the cache apparatus of FIG. 1 can be considered to be an N-way set associative cache structure, where, for any particular set, a cache line of data values can be stored within one cache line in each of the ways. The control circuitry 35 then applies the access likelihood policy 40 in order to determine, for each set, which way (or subset of the ways) currently stores data that it considers most likely to be accessed by a next access request to that set. It then performs a copy or move operation as necessary to ensure that that cache line of data resides within the first data array 20.

In one embodiment, the second data array 25 is organised so as to store all of the data maintained within the cache, and the first data array 20 merely maintains a copy of a subset of that data. In particular, considering the direct mapped example of the first data array where the first data array stores, for each set, one cache line, the control circuitry can be arranged to copy one of the cache lines from the second data array into the first data array, for each set. Further, which way's cache line is copied into the first data array can be determined on a set-by-set basis by the control circuitry, through application of the access likelihood policy 40.

In an alternative embodiment, the second data array 25 may be arranged to store all of the cache lines that are not stored within the first data array 20. In such an arrangement, the control circuitry will move data between the first and second data arrays as necessary, to seek to ensure that the data that is most likely to be accessed resides within the first data array 20 for any particular set. Typically, when a cache line is promoted from the second data array 25 into the first data array 20, a current cache line stored within the first data array will be stored back to the second data array. Such movements of data can be achieved in a variety of ways, but in one embodiment a swap operation is used to move one cache line from the second data array into the first data array, whilst at the same time moving a cache line from the first data array back to the second data array.

Figure 2:
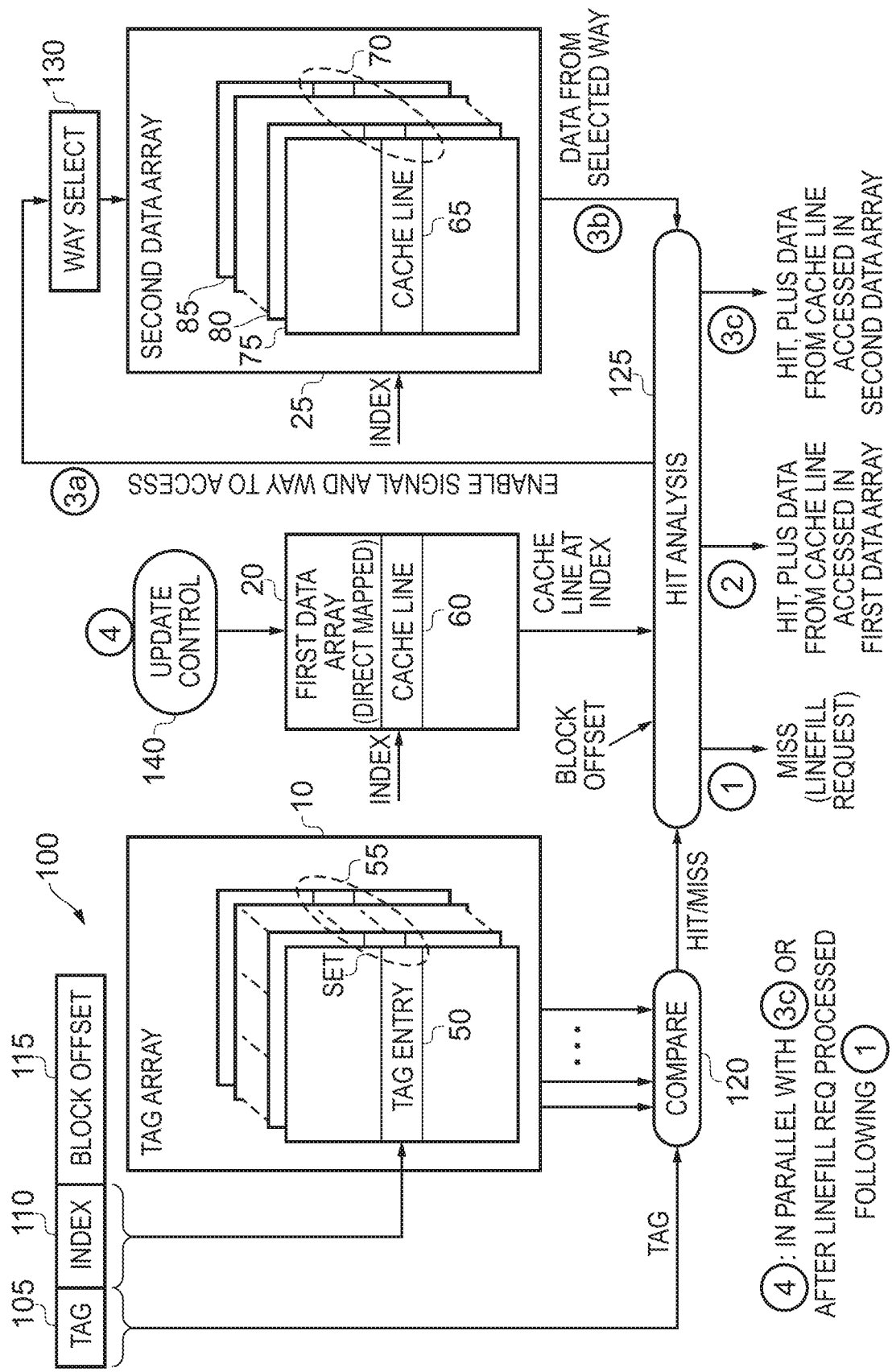
FIG. 2 is a diagram schematically illustrating the operation of the cache apparatus of FIG. 1 in accordance with one embodiment.

The manner in which data is maintained within the cache apparatus of FIG. 1 will now be discussed in more detail with reference to FIG. 2. As shown in FIG. 2, the tag array 10 comprises a plurality of tag entries 50, each tag entry storing a tag value for an associated cache line 60, 65 within the data storage structure 15. Within the second data array 25, the cache lines are organised into a plurality of ways 75, 80, 85, with each set 70 containing one cache line 65 from each of the ways. In one embodiment, the second data array 25 maintains a complete copy of all of the data stored within the cache, and accordingly each set is determined entirely by the contents of cache lines 65 within the second data array 25. In that embodiment, the cache line 60 stored for each set within the first data array 20 is a copy of the cache line from one of the ways of the associated set 70.

In an alternative embodiment, the first and second data arrays 20, 25 may collectively store all of the data maintained by the cache, so that for each set, the cache line for one way is maintained by the cache line 60 within the first data array 20. The remaining cache lines 65 of the set 70 are then maintained within the second data array 25, so that those cache lines 65, in combination with the cache line 60 for the same set within the first data array 20, then collectively form the set of cache lines.

As shown schematically in FIG. 2, the various tag entries within the tag array 10 can be considered to form a plurality of ways corresponding to the plurality of ways maintained within the data storage structure 15 and hence a set of tag entries may be formed, as shown by the reference numeral 55.

When an access request is received by the access circuitry, it will specify an address 100, which as shown in FIG. 2 can be considered to consist of a number of separate portions. In particular, the index portion 110 is used to identify a set to be accessed, and then a lookup operation is performed within the tag array 10 to access each tag entry of that set 55, with the tag values stored in each entry then being forwarded to the compare circuitry 120. In addition, the compare circuitry receives the tag portion 105 of the address 100, and then detects whether that tag portion 105 matches one of the tag values within the accessed set 55 of tag entries 50. On the basis of that comparison, a hit or a miss signal is issued to the hit analysis circuitry 125.

In accordance with the described embodiments, in parallel with the lookup operation performed within the tag array, an access operation is performed within the first data array 20 using the index portion 110 of the address, in order to access the cache line 60 associated with the set identified by the index. That cache line content is provided to the hit analysis circuitry 125, along with the block offset information 115 from the address, enabling the particular data value of interest within the cache line to be identified.

In the event of a hit being detected by the comparison circuitry 120, it is then determined whether the way in which the hit is being detected corresponds to the way whose cache line contents are stored within the first data array 20. This is determined with reference to metadata, that can be stored in a variety of ways. Essentially the hit analysis circuitry needs to be able to determine, for any particular set, which way's data is stored within the first data array. In one embodiment, this can be deduced from associated attributes maintained within the tag entries. In particular, such attributes are already typically stored within cache structures for reference when performing cache block replacement operations, for example deciding when cache line data should be evicted from the cache. Whilst for the purposes of such cache replacement policies, that attribute information may be referred to identify for example the least recently used cache line of a set, that attribute information can also capture information enabling the most recently used cache line to be determined. In one embodiment, the access likelihood policy 40 applied by the control circuitry 35 uses that information to determine the most recently used cache line and stores the most recently used cache line within the first data array.

Hence, in the presence of a hit condition being detected by the comparison circuitry 120, the attribute information can be used to determine whether the hit relates to the most recently used cache line, and if it does, this can be used to deduce that the cache line of interest is the cache line that has been accessed from the first data array 20. In that event, as indicated by the line 2 emanating from the hit analysis circuitry 125, a hit can be propagated from the hit analysis circuitry, along with the data from the cache line accessed in the first data array. For a read operation, that hit signal and associated data can be returned to the processor that issued the access request. For a write access request, the write data can be used to update the cache block in the first data array, at which point an acknowledgement signal can be sent back to the processor to indicate that the write has been performed. In addition, the access circuitry will also cause that updated cache line to be written back to the second data array 25, in embodiments where the second data array maintains a complete copy of all of the data stored within the cache.

In the event of a miss being detected by the comparison circuitry 120, then a miss signal can be issued from the hit analysis circuitry 125 straightaway, as indicated by the line 1 emanating from the hit analysis circuitry. This will initiate a linefill request, as a result of which a cache line's worth of data will be retrieved from a lower level of the memory hierarchy (from lower levels of cache or from main memory), and the returned cache line will then be stored within the data storage structure 15. Dependent on the allocation policy used, that returned cache line of data may be stored within the first data array 20 and/or the second data array 25.

In the event that a hit is detected by the comparison circuitry 120, but the hit analysis circuitry 125 determines that that hit relates to a way whose cache line data is not stored within the first data array 20 for that set, then an enable signal will be issued to the way select circuitry 130 associated with the second data array 25, along with an indication of the way that needs to be accessed in order to obtain the requested data (see line 3a in FIG. 2). In particular, at this stage, it can be determined from the hit signal which way needs to be accessed, and accordingly only one of the ways within the second data array needs to be accessed in order to service the access request. As a result of the access, the data from the selected way can be returned to the hit analysis circuitry (as shown by line 3*b* in FIG. 2), whereafter the hit signal can be emanated from the hit analysis circuitry along with the data retrieved from the second data array, as indicated by the line 3*c* emanating from the hit analysis circuitry 125.

In one embodiment, if a hit occurs which requires data to be accessed from the second data array 25, then an update control function 140 is performed by the control circuitry 35 in order to update the contents of the first data array (as shown by the numeral 4 in FIG. 2). In particular, in one embodiment it is assumed that the most recently accessed way of data is the most likely way to be accessed next, and accordingly having accessed data from the second data array 25, it is appropriate to store that cache line data within the first data array 20. This can be achieved by a copy or a move operation, dependent on whether the first data array merely maintains a copy of the cache line maintained by the second data array, or whether the first and second data arrays collectively maintain the data, and accordingly data needs to be swapped out of the first data array to allow for the accessed cache line from the second data array to then be moved into the first data array.

In parallel with such update operations, the associated attribute information stored within the tag entries 50 of the set 55 can be updated so as to reflect the changes made to the contents of the first and second data arrays. This will be discussed in more detail later for particular example embodiments, with reference to FIGS. 4A to 5B.

In one embodiment, the update control operation 140 can be performed in parallel with the propagation of the hit signal over path 3*c*. In some embodiments, other events can also trigger the update control operation to be performed by the control circuitry 35. For example, following a linefill request issued from the hit analysis circuitry, when the data is subsequently returned for storage within the data storage 15, a determination is made as to whether to store that data within the first data array 20 or the second data array 25. Indeed, in some embodiments the returned data may be stored in both data arrays. The associated attributes within the tag entries 50 of the set 55 can then be updated to keep track of the changes made.

From the above description, it will be seen that the described approach provides a high performance and energy efficient mechanism for accessing the cache. In particular, if there is a cache hit that occurs in relation to a way whose cache line contents are stored within the first data array, then the access request can be processed as soon as the hit condition is detected following the lookup operation. Only the first data array 20 is accessed, and this can be accessed very quickly and in an energy efficient manner, given the reduced size of the first data array. In particular, in one embodiment the first data array is direct mapped, containing only a single cache line for each set, and this provides a very efficient mechanism for accessing the cache. Further, in contrast to the earlier-described way prediction mechanisms, the approach described in FIG. 2 provides higher accuracy/performance than such way prediction schemes, by making use of the information available to the replacement policy to control, on a set by set basis, which data is stored within the first data array.

Only in the event that the hit relates to a cache line that is not stored within the first data array does the lookup in the second data array need to be performed. Such an access to the second data array can be performed over one or more cycles, but can be performed in an energy efficient manner due to there only being a need to access a single one of the ways, namely the way identified by the hit signal.

Further, it can be seen that when there is a cache miss, only the tag array 10 and the first data array 20 are accessed before the miss condition is detected, and at that point the request can be forwarded to the lower levels of the memory hierarchy as a regular cache miss.

Figure 3:
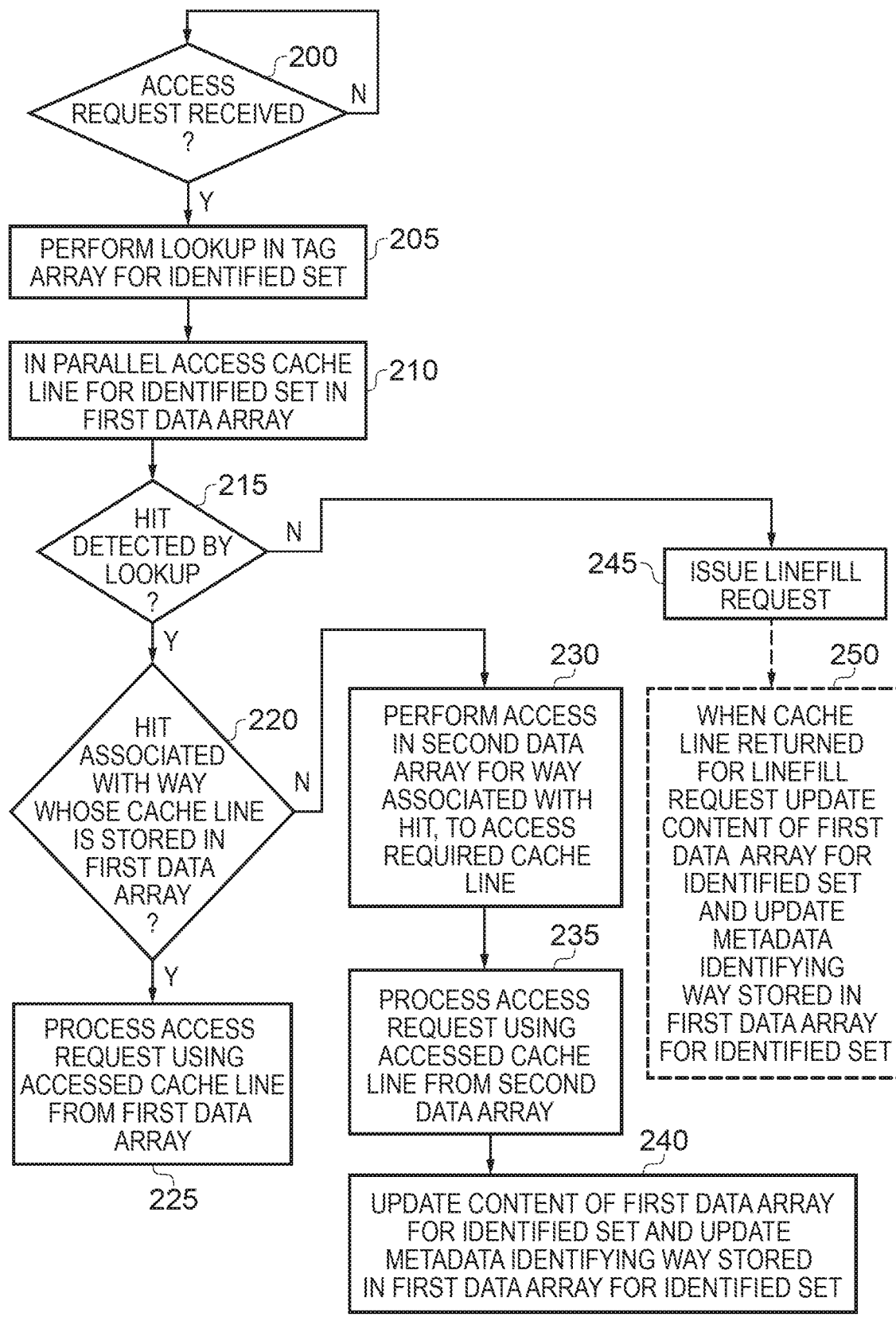
FIG. 3 is a flow diagram illustrating the operation of the cache apparatus of FIG. 1 in accordance with one embodiment.

FIG. 3 is a flow diagram illustrating the operation of the apparatus of FIG. 1 in accordance with one embodiment. At step 200, it is determined whether an access request has been received by the access circuitry 30, and upon receipt the process proceeds to step 205, where a lookup operation is performed within the tag array 10 for the set identified by the access request. In particular, as mentioned earlier, the set is identified by the index portion 110 of the specified address 100, as for example shown in FIG. 2. At step 210, in parallel with the lookup operation performed at step 205, the access circuitry 30 performs an access to the first data array 20 for the identified set, in order to access the cache line of data stored for that set. Again, in this embodiment it is assumed that the first data array is a direct mapped array storing a single cache line for each set. However, if in an alternative embodiment it is a set associative cache storing a small number of cache lines for each set, then at this step each of those cache lines could be accessed. For example in one particular embodiment the first data array 20 may be a two-way set associative cache, and the control circuitry 35 may be arranged to apply the access likelihood policy 40 so as to seek to retain within the first data array 20, for each set, the most recently used cache line and the next most recently used cache line, on the assumption that the next access is likely to proceed with respect to one of those two cache lines.

At step 215, it is determined whether a hit is detected as a result of the lookup operation, and if so it is then determined at step 220 whether the hit is associated with a way whose cache line is stored in the first data array 20 for the set in question. If it is, then at step 225 the access request can be processed using the accessed cache line from the first data array 20.

At step 220, the hit analysis circuitry 125 can reference the metadata information maintained to identify for which way (or ways) cache line data is stored for the identified set within the first data array. In one embodiment, such metadata can be used to identify the most recently used way for the identified set, and the control circuitry is arranged to maintain the cache line data for the most recently used way of the set within the first data array. Accordingly, based on a knowledge of the most recently used way, and the way associated with the hit, the hit analysis circuitry can determine whether the cache line data associated with the hit is stored within the first data array or not.

Whilst in one embodiment the metadata is stored as part of the attribute information maintained within the tag entries 50 of each set 55, in alternative embodiments the metadata can be stored elsewhere, for example in a dedicated piece of storage referenced by the hit analysis circuitry 125, and updated by the control circuitry 35 to reflect, for each set, which way(s) have their cache line data stored within the first data array 20.

If at step 220 it is determined that the hit is instead associated with a way whose cache line is not stored in the first data array, then at step 230 an additional access operation is performed, this time in respect of the second data array, in order to access the way that is associated with the hit signal. Again, the index portion of the address is used to identify the required set, and as a result a cache line of data is accessed in the second data array. Thereafter at step 235 the access request can be processed using the accessed cache line from the second data array.

In one embodiment, in addition to step 235, the control circuitry 35 is arranged to perform an update process at step 240 in order to update the content of the first data array for the identified set. In particular, the cache line that has been accessed in the second data array 25 will be promoted to the first data array 20 in one embodiment, on the basis that that represents a cache line that is more likely to be accessed by the next access request directed at the same set. In one embodiment where the second data array contains a full copy of the data stored in the cache, this can be implemented using a copy operation to copy that cache line contents into the relevant set of the first data array, overwriting the existing contents of the first data array. However, as mentioned earlier, in alternative embodiments where the first data array and second data array collectively store the data, this update may require swapping the current contents of the cache line for the relevant set that is stored in the first data array with the cache line that has now been retrieved from the second data array.

In addition to updating the content of the first data array, the metadata that is maintained to identify the way (or ways) stored in the first data array for the identified set is updated, so that on a subsequent lookup, the hit analysis circuitry 125 can determine in the presence of a hit whether that hit relates to the contents of the first data array.

As mentioned earlier, this metadata can be stored in a variety of ways, but in one embodiment is contained within attribute information of the tag entries 50 of the associated set 55.

If at step 215 it is determined that a hit has not been detected, then a linefill request is issued at step 245 from the access circuitry 30 to the lower levels of the memory hierarchy, resulting in due course in a cache line's worth of data being returned to the access circuitry. In addition to enabling the access request to then be processed using that data, the access circuitry will typically arrange for the cache line of data to be stored within the data storage structure 15. In one embodiment, as indicated by step 250, this cache line of data is stored within the first data array 20 in association with the identified set. Depending on how the first and second data arrays are organised, it may be necessary to either evict back to the memory hierarchy the current content within the first data array that is being overwritten, or to evict one of the cache lines for the set maintained in the second data array back to the memory hierarchy, so as to make room in the second data array for the data that needs to be removed from the first data array to make space for the new linefill data.

In an embodiment where the second data array maintains a complete copy of all of the data stored within the cache, then in addition to storing the linefill cache contents within a cache line of the first data array 20, that data is also stored within a cache line of the second data array 25, with one of the cache lines in the second data array being evicted to memory. This can be done in a write through manner, so that updates in the first data array are replicated at the same time within the second data array, or alternatively a writeback policy could be employed for the first data array, so that updates in the first data array are replicated within the second data array at a suitable point in time, asynchronously to the update performed within the first data array, thereby enabling the update of the second data array to be moved off of the critical path.

At step 250, the metadata is also updated to take account of the changes made to the content of the first and second data arrays.

In an alternative embodiment, it may be decided that such a cache line of data returned as a result of a linefill request should not immediately be put within the first data array, but instead should at that time merely be stored within the second data array. This approach can also be adopted for lines fetched as a result of prefetch requests. In such an embodiment, it may for example be decided that if a subsequent access request accesses that data, at which time it will be accessed from the second data array, then at that point that cache line of data should be promoted to the first data array 20. In particular, for some data access patterns, it may not be appropriate to assume that a cache line retrieved via a linefill or prefetch request will necessary be the most likely cache line of the relevant set to be accessed next.

FIG. 4A illustrates one example arrangement of the first data array and the second data array. In this embodiment, the second data array 305 maintains a copy of the data stored within the cache for all of the ways of the N-way set associative cache. Accordingly, the second data array 305 can be considered to comprise of the N ways 310, 315, 320, 325, 330, each way containing a plurality of cache lines, and in particular each way providing one cache line for each set, one such set being indicated by the reference numeral 340. In such an embodiment, the first data array 300 effectively provides an extra copy of some of the cache lines stored in the second data array. In particular, in one embodiment, for each set, the most recently used cache line 302 is stored within the first data array 300. When it is necessary to update the contents of the first data array, this can be performed by the control circuitry 35 using a copy operation.

As shown in FIG. 4B, in one embodiment each tag entry in the set associative tag array 10 may then take the form shown. In particular, each tag entry 350 stores a tag value 355 and in one embodiment includes a valid bit 360 identifying whether the corresponding cache line stores valid data, and a dirty bit 365 to identify whether the current contents of that cache line are more up to date than the version held in main memory. As will be well understood by those skilled in the art, the dirty bit is referred to during eviction operations in order to determine whether the evicted cache line contents need to be written back to memory or not. As will be appreciated by those skilled in the art, other information may also be provided within the tag entry (not shown in FIG. 4B), for example other bits of information that relate to the cache coherency protocol as well as other mechanisms that the cache controller needs to support.

In addition, an attribute field 370 is provided for storing one or more associated attributes. In one embodiment, these attributes provide an identifier for the most recently used way. In one embodiment, each individual tag entry could store this information, or alternatively the identification of the most recently used way may be determined from the attribute information maintained in each of the entries for the relevant set. For example, each entry may include a flag that identifies when the corresponding cache line was last used, relative to each of the other cache lines in the set. By reviewing this flag information for each of the tag entries in the set, it can hence be identified which cache line within the set is the most recently used cache line.

Figure 5A:
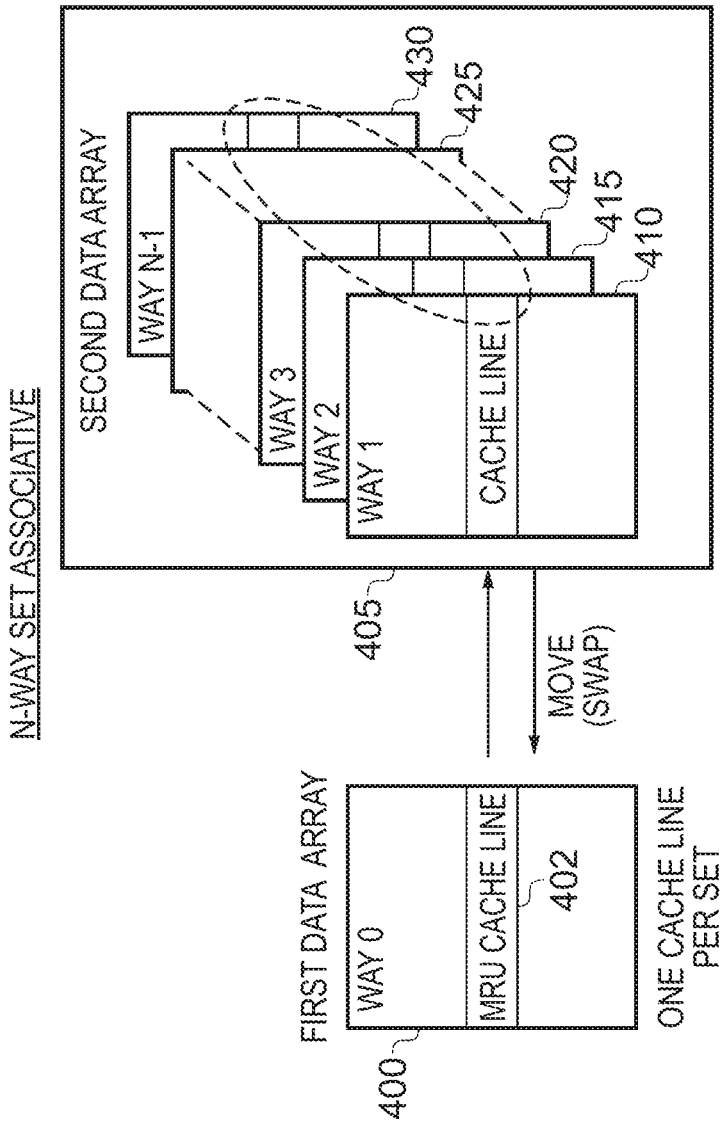
FIGS. 5A and 5B illustrate one arrangement of the first data array and the second data array that may be used in other embodiments, along with the format of associated tag entries within the tag array.
Figure 5B:
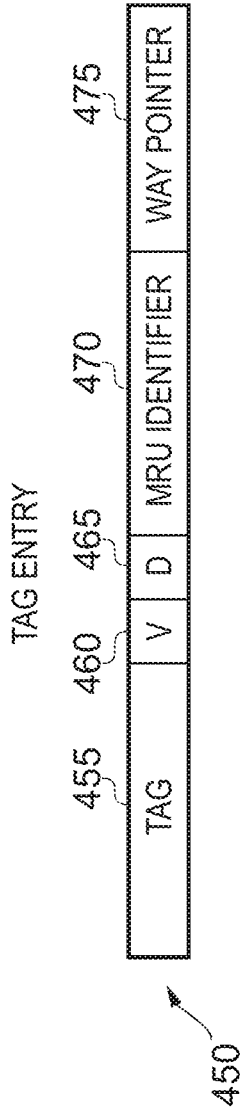

FIGS. 5A and 5B illustrate an alternative embodiment, where the first and second data arrays 400, 405 collectively store all of the data maintained by the cache. In this example, one of the ways can logically be considered to be associated with the first data array 400, with all of the remaining ways then associated with the second data array 405. However, the control circuitry 35 is still used to dynamically control, on a set-by-set basis, which cache line is stored within the way associated with the first data array. Accordingly, by way of example, as shown in FIG. 5A the first data array 400 may be assumed to provide way 0. Then, based on application of the access likelihood policy 40 by the control circuitry 35 on a set-by-set basis, the control circuitry can determine which cache line within the set should be stored within way 0. Move operations (in one embodiment implemented as a swap operation) can then be used to move data as required between the first data array and the second data array, with the aim that for each set, way 0 stores the cache line for the most recently used way.

With reference to FIG. 2, the tag array entries can also be considered to logically form a plurality of ways, and in one embodiment the individual tag values can be moved between tag entries of the different ways to mirror how the data is being moved between the first and second data arrays. Hence, purely by way of example, if for set A it is decided based on application of the access likelihood policy that the current cache line contents in way 3 should be moved to way 0, then the cache line from way 3 will be moved from the second data array into the first data array, and the current contents within the first data array for that set will be moved back into the second data array, typically being stored in way 3. For the cache line that has been moved from way 3 to way 0, the associated tag value can be moved from the tag entry for way 3 to the tag entry for way 0, and similarly for the cache line moved from way 0 (the first data array) back to way 3, the associated tag value can be moved from the tag entry for way 0 to the tag entry for way 3.

However, in an alternative embodiment, in order to avoid the need to move the tag values around within the tag entries as data is reallocated between the first and second data arrays, each tag entry can take the form shown in FIG. 5B. Here the tag field 455, valid field 460, dirty field 465 and MRU identifier field 470 correspond generally with the fields 355, 360, 365 and 370 shown in FIG. 4B. However, in addition a way pointer field 475 is provided to identify the way in which the cache line data associated with the tag value in field 455 is provided. When such a way pointer is provided, it is no longer necessary to move the tag values between the various tag entries as cache lines are moved between the first and second data arrays, and instead it is just necessary to update the affected way pointers to identify in which way within the data storage structure 15 each cache line is stored.

When using the approach of FIG. 5A, where a particular way is associated with the first data array, and the cache lines are moved between the first and second data arrays so that that particular way associated with the first data array is predisposed towards storing the most recently used cache lines, then the hit analysis circuitry 125 does not need to refer to the MRU identifier metadata when determining whether a hit relates to the cache line data stored in the first data array. In particular, considering the example of FIG. 5A the hit analysis circuitry 125 will know that the first data array stores the data for way 0, and accordingly if the hit signal identifies that the hit is for way 0, it is immediately known that the data accessed in the first data array is the required data.

However, as data is moved between the first and second data arrays due to application of the access likelihood policy 40 by the control circuitry 35, that metadata is updated as discussed earlier so as to enable the control circuitry to continue to track the relative order in which the cache lines for each set have been most recently accessed, so as to enable that information to be referred to during each subsequent application of the access likelihood policy.

If desired, a power saving mode of operation can be supported, which when enabled causes the first data array to no longer be accessed in parallel with the tag array lookup. In such a mode, the cache operates in a similar way to a standard sequentially accessed cache, with the tag array lookup being performed first, followed by a lookup in the relevant way of the data array if a hit is detected. This can provide further flexibility in how the cache is used.

The cache structure of the embodiments described above with reference to the figures may be referred to as a buffered cache, since the first data array 20 can be considered to form a buffer for a subset of the data maintained by the cache. There are a number of advantages of the described buffered cache mechanism when compared with known way prediction mechanisms. Firstly, lower latency and energy waste can typically be achieved on a correct prediction (i.e. where the required data is stored in the first data array), since the first data array is faster to access and more energy efficient to access than a large data bank. In addition, there are lower cache miss latency penalties since the initial probe to perform the tag lookup and in parallel perform the access to the first data array can be concluded faster, and thus a miss can be detected faster as well. Further, the mechanism has been found to provide better accuracy without extra latency. In particular, way prediction mechanisms typically trade accuracy for latency. Way predictors with good accuracy (but still worse than the accuracy of the buffered cache mechanism described herein) are typically on the critical path. They use the address of the request in order to make the prediction, but add extra latency, even for cache hits. Way predictors that are provided outside of the critical path make predictions in parallel with the address calculation, and as that prediction is not based on the address itself they are typically much less accurate. Finally, there is no need for complex structures such as bloom filters to predict the way in which the data will be found, or modifications to the processor core to speed up the access to such structures.

When compared with the earlier-described filter cache mechanism, the approach described in the embodiments herein also provides a number of significant advantages, when the cache structure described herein is used as a level one cache. Firstly, there is a lower level one cache miss penalty. A request that misses in the level one cache would first have to miss in the filter cache in accordance with the known filter cache mechanisms, and accordingly there would be two independent probes before a cache miss would be detected, the first probe being in respect of the filter cache, and the second probe being in respect of the level one cache. In contrast, a miss in the buffered cache described herein is determined with only a single probe. Further, there is a smaller energy waste on misprediction. In particular a miss to the filter cache requires a second probe to the level one cache. Often, the second probe will involve parallel lookups in all ways of the data array in order to reduce the miss penalty, but that consumes significant extra energy. In contrast, the buffered cache mechanism described herein requires a second probe only when the matching tag does not relate to a cache line stored in the first data array, but that second probe activates only the right way within the second data array. Furthermore, there is also smaller energy waste on a level one cache miss. As mentioned above, a miss to the level one cache in a system with a filter cache requires two unsuccessful probes, with the second involving a parallel lookup in the data RAMs of the level one cache. In contrast, with the buffered cache mechanism described, this requires only a single probe before a level one miss is detected.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A cache apparatus comprising:
   a data storage structure providing N cache ways that each store data as a plurality of cache blocks, the data storage structure being organized as a plurality of sets, where each set comprises a cache block from each way, the data storage structure comprising a first data array and a second data array, at least the second data array being set associative;
   a set associative tag storage structure to store a tag value for each cache block, the set associative tag storage structure being shared by the first data array and the second data array;
   control circuitry to apply an access likelihood policy to determine, for each set, a subset of the cache blocks of that set to be stored within the first data array;
   access circuitry, responsive to an access request, to perform a lookup operation within an identified set of the set associative tag storage structure overlapped with an access operation to access within the first data array the subset of the cache blocks for the identified set;
   the access circuitry being responsive to a hit condition being detected by the lookup operation that identifies a cache block present in the first data array, to process the access request using the identified cache block as accessed within the first data array, and being responsive to a hit condition being detected by the lookup operation that identifies a cache block absent in the first data array, to perform a further access operation to access the identified cache block within a selected way of the second data array.

2. A cache apparatus as claimed in claim 1, wherein in the event of a miss condition being detected by the lookup operation, the access circuitry is arranged to issue a cache miss signal whilst bypassing performance of an access to the second data array.

3. A cache apparatus as claimed in claim 1, wherein the control circuitry is arranged, when applying the access likelihood policy for each set, to select for storage in the first data array the cache block from one or more most recently used ways of that set.

4. A cache apparatus as claimed in claim 3, wherein the control circuitry is arranged, when applying the access likelihood policy for each set, to select for storage in the first data array the cache block from a most recently used way of that set.

5. A cache apparatus as claimed in claim 1, wherein the first data array is direct mapped and arranged to store, for each set, the cache block for one way of that set as determined by the control circuitry.

6. A cache apparatus as claimed in claim 1, wherein the set associative tag storage structure has a plurality of entries, each entry arranged to store a tag value and associated attributes, the associated attributes being sufficient to enable the access circuitry, when the hit condition is detected during the lookup operation, to determine whether the cache block identified by the hit condition is present in the first data array.

7. A cache apparatus as claimed in claim 6, wherein the associated attributes identify a most recently used way for the set.

8. A cache apparatus as claimed in claim 1, wherein the second data array is arranged to store all of the cache blocks for each of the N cache ways, and the control circuitry is arranged, for each set, to cause the determined subset of the cache blocks of that set to be copied into the first data array.

9. A cache apparatus as claimed in claim 8, wherein when application of the access likelihood policy causes the determined subset of the cache blocks to change, the control circuitry causes any cache block removed from the determined subset to be overwritten in the first data array by a new cache block of the determined subset as copied from the second data array.

10. A cache apparatus as claimed in claim 1, wherein the second data array is arranged to store those cache blocks of the N cache ways that are absent from the first data array, and the control circuitry is arranged to move cache blocks between the first and second data arrays so as to ensure that, for each set, the determined subset of the cache blocks of that set are stored in the first data array.

11. A cache apparatus as claimed in claim 10, wherein the set associative tag storage structure has a plurality of entries, each entry arranged to store a tag value and a way pointer to identify which way contains the cache block associated with that tag value, the control circuitry being arranged to cause the way pointer for a tag value associated with a cache block moved between the first and second data arrays to be updated to take account of the movement of the cache block.

12. A cache apparatus as claimed in claim 10, wherein the set associative tag storage structure has a plurality of entries, each entry arranged to store a tag value for an associated cache block, the control circuitry being arranged to cause the tag value associated with a cache block moved between the first and second data arrays to be moved between entries of the tag storage structure to take account of the movement of the cache block.

13. A cache apparatus as claimed in claim 1, wherein the control circuitry is responsive to one or more events to apply the access likelihood policy in order to alter the subset of the cache blocks to be stored within the first data array for at least one set.

14. A cache apparatus as claimed in claim 13, wherein said one or more events comprise detection of the hit condition by the lookup operation when that hit condition identifies a cache block absent in the first data array, the control circuitry being arranged to cause the identified cache block accessed within the selected way of the second data array in response to that hit condition to be stored within the first data array.

15. A cache apparatus as claimed in claim 13, wherein said one or more events comprise a miss condition being detected by the lookup circuitry, causing a cache block to be retrieved from memory for storage in the data storage structure, the control circuitry causing the retrieved cache block to be stored within the first data array.

16. A cache apparatus as claimed in claim 15, wherein the control circuitry also causes the retrieved cache block to be stored within the second data array.

17. A cache apparatus as claimed in claim 1, wherein when the access circuitry causes a cache block to be retrieved from memory for storage in the data storage structure, the control circuitry is arranged to cause the retrieved cache block to be initially stored within the second data array, but to be moved to the first data array if a subsequent access request targets that cache block.

18. A cache apparatus as claimed in claim 1, wherein the access circuitry is responsive to an address specified by the access request to use an index portion of the address to determine the identified set of the set associative tag storage structure within which the lookup operation is performed, and the hit condition indicates that a tag portion of the address matches a tag value for one of the cache blocks in that identified set.

19. A method of caching data, comprising:
providing a data storage structure having N cache ways that each store data as a plurality of cache blocks, and organizing the data storage structure as a plurality of sets, where each set comprises a cache block from each way, the data storage structure comprising a first data array and a second data array, and at least the second data array being set associative;
providing a set associative tag storage structure to store a tag value for each cache block, the set associative tag storage structure being shared by the first data array and the second data array;
applying an access likelihood policy to determine, for each set, a subset of the cache blocks of that set to be stored within the first data array;
responsive to an access request, performing a lookup operation within an identified set of the set associative tag storage structure overlapped with an access operation to access within the first data array the subset of the cache blocks for the identified set;
responsive to a hit condition being detected by the lookup operation that identifies a cache block present in the first data array, processing the access request using the identified cache block as accessed within the first data array; and
responsive to a hit condition being detected by the lookup operation that identifies a cache block absent in the first data array, performing a further access operation to access the identified cache block within a selected way of the second data array.

20. A cache apparatus comprising:
a data storage means for providing N cache ways that each store data as a plurality of cache blocks, the data storage means organized as a plurality of sets, where each set comprises a cache block from each way, the data storage means comprising a first data array means and a second data array means, at least the second data array means being set associative;
a set associative tag storage means for storing a tag value for each cache block, the set associative tag storage means being shared by the first data array means and the second data array means;
control means for applying an access likelihood policy to determine, for each set, a subset of the cache blocks of that set to be stored within the first data array means;
access means for performing, in response to an access request, a lookup operation within an identified set of the set associative tag storage means overlapped with an access operation to access within the first data array means the subset of the cache blocks for the identified set;
the access means, responsive to a hit condition being detected by the lookup operation that identifies a cache block present in the first data array means, for processing the access request using the identified cache block as accessed within the first data array means, and being responsive to a hit condition being detected by the lookup operation that identifies a cache block absent in the first data array means, for performing a further access operation to access the identified cache block within a selected way of the second data array means.

* * * * *